United States Patent
Zelek et al.

(10) Patent No.: US 8,938,442 B2
(45) Date of Patent: Jan. 20, 2015

(54) SYSTEMS AND METHODS FOR EFFICIENT PAGING OF DATA

(75) Inventors: Mark Clarence Zelek, Cary, NC (US); Jonathan Arthur McBride, Austin, TX (US)

(73) Assignee: CA, Inc., Islandia, NY (US)

( * ) Notice: Subject to any disclaimer, the term of this patent is extended or adjusted under 35 U.S.C. 154(b) by 172 days.

(21) Appl. No.: 13/568,890

(22) Filed: Aug. 7, 2012

(65) Prior Publication Data

US 2014/0046950 A1    Feb. 13, 2014

(51) Int. Cl.
  *G06F 7/00* (2006.01)
  *G06F 17/30* (2006.01)

(52) U.S. Cl.
  USPC .......................................... 707/711; 707/741

(58) Field of Classification Search
  None
  See application file for complete search history.

(56) References Cited

U.S. PATENT DOCUMENTS

| | | | |
|---|---|---|---|
| 5,806,065 A * | 9/1998 | Lomet | 707/610 |
| 6,278,992 B1 * | 8/2001 | Curtis et al. | 707/711 |
| 7,567,952 B2 | 7/2009 | Muras et al. | |
| 7,734,620 B2 | 6/2010 | Muras et al. | |
| 7,962,489 B1 * | 6/2011 | Chiang et al. | 707/741 |
| 2002/0120617 A1 * | 8/2002 | Yoshiyama et al. | 707/3 |
| 2008/0243762 A1 * | 10/2008 | Allerton et al. | 707/2 |

* cited by examiner

*Primary Examiner* — Robert Beausoliel, Jr.
*Assistant Examiner* — Michael Pham
(74) *Attorney, Agent, or Firm* — Baker Botts L.L.P.

(57) ABSTRACT

Paging of data includes querying a table of data to determine an item identifier for each item in the table. An index table including an index identifier column of sequential integers and a corresponding item identifier column for each item in the table is generated and stored in a memory. A page index table including the item identifier that corresponds to a first index identifier and each item identifier that corresponds to one plus a pagesize multiple of the index identifier is generated and stored in a memory. A desired page of data is retrieved using the determined item identifier corresponding to the first item on the desired page and either the determined item identifier corresponding to the first item on a next page after the desired page or a determined item identifier corresponding to the last item on the desired page.

16 Claims, 4 Drawing Sheets

SYSTEMS AND METHODS FOR EFFICIENT PAGING OF DATA

BACKGROUND

The present disclosure relates to systems and methods for efficiently paging through large data sets.

Database systems have been developed that allow a computer to store a large amount of information in a way that allows a user to search for and retrieve specific information in the database. Retrieval of information from a database is typically done using queries. A query often specifies conditions that apply to one or more columns of the database, and may specify relatively complex logical operations on multiple columns. The database is searched for records that satisfy the query, and those records are returned as the query result.

It is commonly recommended to use the OFFSET and FETCH clauses instead of the TOP clause to implement a query paging solution and limit the number of rows sent to a client application. Using OFFSET and FETCH as a paging solution requires running the query one time for each "page" of data returned to the client application. For example, to return the results of a query in 10-row increments, the query must be executed one time to return rows 1 to 10 and then the query must run again to return rows 11 to 20 and so on. Each query is independent and not related to each other in any way. This means that, unlike using a cursor in which the query is executed once and the state is maintained on the server, the client application is responsible for tracking the state. Accordingly, to achieve stable results between query requests using OFFSET and FETCH, the following conditions must be met: (1) the underlying data that is used by the query must not change—that is, either the rows touched by the query are not updated or all requests for pages from the query are executed in a single transaction using either snapshot or serializable transaction isolation; and (2) the ORDER BY clause contains a column or combination of columns that are guaranteed to be unique.

BRIEF SUMMARY

According to one aspect of the disclosure, a method comprises querying a table of data to determine an item identifier for each item in the table. Further, an index table including an index identifier column of sequential integers and a corresponding item identifier column of the determined item identifier for each item in the table is generated and stored in a memory. Moreover, a page index table including the item identifier that corresponds to a first index identifier in the index table and each item identifier that corresponds to one plus a pagesize multiple of the index identifier in the index table is generated and stored in a memory, such that the item identifier corresponding to a first item on each page is determined. A desired page of data is retrieved using the determined item identifier corresponding to the first item on the desired page and either the determined item identifier corresponding to the first item on a next page after the desired page or a determined item identifier corresponding to the last item on the desired page.

According to another aspect of the disclosure, an apparatus comprises a processor, a memory coupled to the processor containing a database, and a query stored in the memory that retrieves an item identifier for each item in a result table selected from the database. The apparatus further comprises an index table creator configured to generate an index table comprising an index identifier column comprising sequential integers, and a corresponding item identifier column comprising the retrieved item identifier for each item in the result table; and a page index table creator configured to generate a page index table comprising the item identifier that corresponds to a first index identifier in the index table, and each item identifier that corresponds to one plus a pagesize multiple of the index identifier in the index table, such that the item identifier corresponding to a first item on each page is determined.

According to a further aspect of the disclosure, a computer program product comprises a computer readable storage medium having computer readable program code embodied therewith, and the computer readable program code comprises computer readable program code configured to query a table of data to determine an item identifier for each item in the table. Further, the computer program product comprises computer readable program code configured to generate an index table comprising: an index identifier column comprising sequential integers, and a corresponding item identifier column comprising the determined item identifier for each item in the table. Moreover, the computer program product comprises computer readable program code configured to generate a page index table comprising: the item identifier that corresponds to a first index identifier in the index table, and each item identifier that corresponds to one plus a pagesize multiple of the index identifier in the index table, such that the item identifier corresponding to a first item on each page is determined.

According to yet another aspect of the disclosure, a system comprises a querying unit configured to query a table of data to determine an item identifier for each item in the table. The system further comprises an index table creating unit configured to generate an index table comprising: an index identifier column comprising sequential integers, and a corresponding item identifier column comprising the determined item identifier for each item in the table. Moreover, the system comprises a page index table creating unit configured to generate a page index table comprising: the item identifier that corresponds to a first index identifier in the index table, and each item identifier that corresponds to one plus a pagesize multiple of the index identifier in the index table, such that the item identifier corresponding to a first item on each page is determined; and a memory configured to store the table of data, the index table, and the page index table.

Objects, features, and advantages of aspects of the disclosure will be apparent to persons of ordinary skill in the art from the following description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
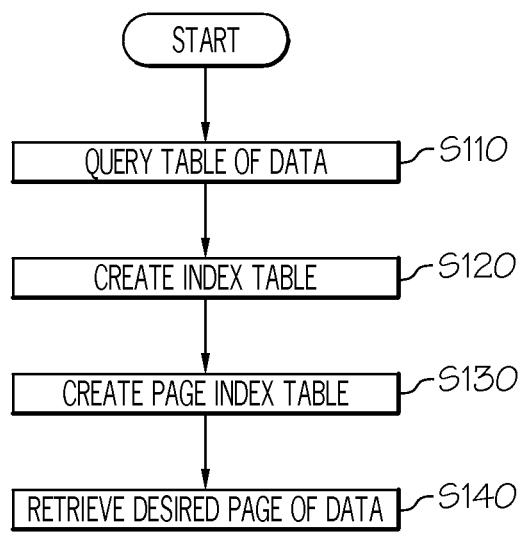
FIG. 1 illustrates a flowchart depicting a process, according to an embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

According to embodiments of the disclosure, a primary table of data may not need to be sorted according to an ORDER BY clause each time that a page of data is retrieved. Further, even if the primary table is joined with any other tables, only those rows that need to be examined may be examined. Moreover, additional time to count offset rows of data, which would otherwise increase proportionally to the square of the number of rows, may not be required. Thus, according to embodiments of the disclosure, the number of rows that must be examined with a query for each page may be effectively reduced, and may include only the number of rows included in the particular page. In other words, for each page that is requested, only the number of rows corresponding to the size of the page may need to be examined.

According to embodiments of the disclosure, for a large result set in a database or storage device, an initial process may query the database or storage device to return a unique index for each row. The unique index values may be inserted into a table that has two columns: an auto-incrementing column of sequential integers (e.g., the first row gets a value of 1, the second row gets a value of 2, etc.) and a column containing the unique index values from the query. Table 1 is an example of such a table.

TABLE 1

| IndexID | ItemID |
|---|---|
| 1 | 1208 |
| 2 | 1215 |

TABLE 1-continued

| IndexID | ItemID |
|---|---|
| ... | ... |
| 5000 | 78654 |
| 5001 | 78657 |
| ... | ... |
| 10000 | 165420 |
| 10001 | 165421 |
| ... | ... |
| 800000 | 1398642 |
| ... | ... |
| 800423 | 1435421 |

With this table, the precise range of rows that will be returned for each page may be determined. For example, if the pagesize is 5000, the rows for the first page may have an ItemID ≥1208 and <78657, the rows in the second page may have an ItemID ≥78657 and <165421, and the rows in the last page may have an ItemID ≥1398642. It may not be necessary to use an upper bound (e.g., 1435421) for the last page. Accordingly, a query may utilize the ItemID bounds based on the pagesize to retrieve each page of data, with processing required only for the number of rows in each page.

Referring to FIG. 1, at S110, a table of data may be queried to determine an item identifier (i.e., Item ID) for each item in the table. The table of data may be any type of database, a result set from a database, a collection of data, or the like, or any combination thereof. At S120, an index table may be generated. The index table may be stored in a memory. The index table may comprise an index identifier (i.e., Index ID) column of sequential integers or natural numbers, and a corresponding item identifier (Item ID) column including the determined Item ID for each item in the table. The Item ID may be a unique identifier (e.g., a number, string, or the like) that corresponds to a particular item, piece of data, or row.

At S130, a page index table may be generated. The index table may be stored in a memory. The page index table may comprise the Item ID that corresponds to a first index identifier (Index ID) in the index table, and each Item ID that corresponds to one (1) plus a pagesize multiple of the Index ID in the index table, such that the Item ID corresponding to a first item on each page is determined. For example, if pagesize is 1000, the page index table may include the determined Item ID that corresponds to Index ID one (1), and the determined Item ID corresponding to each of one (1) plus pagesize multiples of Index ID (i.e., 1001, 2001, 3001, 4001, etc.). Thus, the rows of the page index table may identify the Item ID for each of the first rows of each page for a given pagesize.

At S140, a particular page or plurality of pages of data may be retrieved. A query to retrieve the page may use the determined Item ID corresponding to the first row on the page and the determined Item ID corresponding to the first row on a next page after the desired page. For example, the query may include the determined Item ID corresponding to the first row on the page as a lower bound (i.e., identifying the first row of data to be retrieved for the page) and the determined Item ID corresponding to the first row on a next page after the desired page as an upper bound (i.e., the row after the last row of data to be retrieved for the page identifies the last row of data to be retrieved). For example, using the values in Table 1 in which pagesize is 5000, a query may be:
SELECT * FROM foo WHERE ItemID ≥1208 AND ItemID <78567 ORDER BY ItemID ASC
In this example, this query may be used to retrieve the first page of data for a pagesize of 5000. Thus, utilizing the page index table, only the number of rows approximately corresponding to the size of the page may need to be examined to retrieve a page of data.

The page index table generated at 5130 may further comprise each Item ID that corresponds to the pagesize multiple of the Index ID, such that the Item ID corresponding to a last item on each page is determined. For example, if pagesize is 1000, the page index table may further include the determined Item ID corresponding to each of pagesize multiples of Index ID (i.e., 1000, 2000, 3000, 4000, etc.). Thus, the rows of the page index table may identify the Item ID for each of the first rows of each page for a given pagesize and each of the last rows of each page for the given pagesize.

At S140, a particular page or plurality of pages of data may be retrieved with a query using the determined Item ID corresponding to the first row on the page and the determined Item ID corresponding to the last row on the page. For example, the query may include the determined Item ID corresponding to the first row on the page as a lower bound (i.e., identifying the first row of data to be retrieved for the page) and the determined Item ID corresponding to the last row on the page as an upper bound (i.e., identifying the last row of data to be retrieved for the page). For example, using the values in Table 1 in which pagesize is 5000, a query may be:
SELECT * FROM foo WHERE ItemID ≥1208 AND ItemID ≤78564 ORDER BY ItemID ASC
In this example, this query may be used to retrieve the first page of data for a pagesize of 5000. Thus, utilizing the page index table, only the number of rows corresponding to the size of the page may need to be examined to retrieve a page of data.

According to an embodiment of the disclosure, a computer readable storage medium having computer readable program code embodied therewith may be provided. The computer readable program code may be configured to perform the method or functions outlined above.

Figure 2:
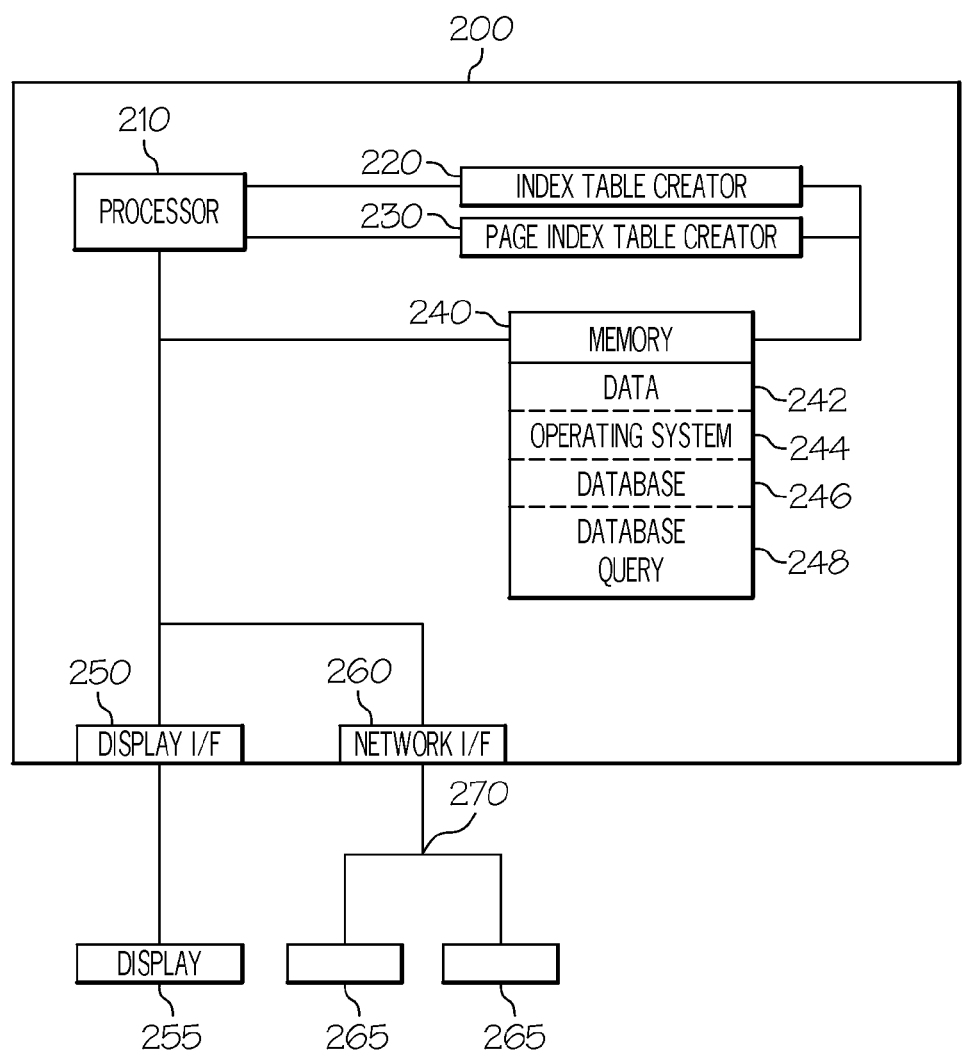
FIG. 2 illustrates an apparatus, according to an embodiment.

Referring to FIG. 2, apparatus 200 is depicted, in accordance with an embodiment of the disclosure. Apparatus 200 may comprise a processor 210, a memory 240, an index table creator 220, a page index table creator 230, a display interface 250, and a network interface 260. These components may be interconnected through the use of a system bus (not shown).

Memory 240 may comprise data 242, an operating system 244, a database 246, and one or more database queries 248. One or more of the database queries 248 may include one or more SELECT statements. A query 248 may be stored in memory 240 that retrieves an Item ID for each item in a result table selected from database 246. Data 242 may correspond to any data that serves as input to or output from any program in apparatus 200, or may correspond to a result set, index table data, page index table data, or the like, or any combination thereof.

Operating system 244 may be a known multitasking operating system. Nevertheless, those skilled in the art will appreciate that the spirit and scope of the present disclosure is not limited to any one operating system, and an operating system may be excluded from apparatus 200. Database 246 may be any suitable database, whether currently known or developed in the future. Database query 248 may be a query in a format compatible with database 246 that may allow information stored in database 246 that satisfies database query 248 to be retrieved. Database query 248 also may be received from an alternative source (e.g., network, cloud, user input, or the like) and may not be stored in memory 240. While data 242, operating system 244, database 246, and database query 248 are depicted to reside in memory 240, those skilled in the art will recognize that these items are not necessarily all completely contained in memory 240 at the same time.

Processor 210 may be constructed from one or more microprocessors and/or integrated circuits. Processor 210 may execute program instructions or code stored in memory 240. Memory 240 may store programs or code and data that processor 210 may access. When apparatus 200 is powered on or starts up, processor 210 initially may execute the program instructions or code that comprise operating system 244. Operating system 244 may be a sophisticated program that manages the resources of apparatus 200. Although apparatus 200 is depicted to contain only a single processor, those skilled in the art will appreciate that the present disclosure may have multiple processors and/or multiple system buses.

Display interface 250 may be used to directly connect one or more displays 255 to apparatus 200. Nevertheless, apparatus 200 does not necessarily require a display 255 and interaction with apparatus 200 may occur via network interface 260. Network interface 260 may be used to connect other computer systems and/or workstations 265 to apparatus 200 across a network 270. Nevertheless, the present disclosure applies equally no matter how apparatus 200 may be connected to other computer systems and/or workstations.

Index table creator 220 may be configured to generate an index table comprising an Index ID column of sequential integers or natural numbers, and a corresponding Item ID column including the retrieved Item ID for each item in a result set or table. The index table generated by index table creator 220 may be stored in memory 240.

Page index table creator 230 may be configured to generate a page index table comprising the Item ID that corresponds to a first Index ID in the index table, and each Item ID that corresponds to one plus a pagesize multiple of the Index ID in the index table, such that the Item ID corresponding to a first item on each page is determined. For example, if pagesize is 2000, the page index table may include the determined Item ID that corresponds to Index ID of 1, 2001, 4001, 6001, etc. Page index table creator 230 may be configured to generate the page index table that further comprises each Item ID that corresponds to the pagesize multiple of the Index ID, such that the Item ID corresponding to a last row on each page is determined (e.g., if pagesize is 2000, the page index table may include the determined Item ID that corresponds to Index ID of 2000, 4000, 6000, etc.). The page index table generated by page index table creator 230 may be stored in memory 240.

A query 248 may be stored in memory 240 that may retrieve a particular page of data using the determined Item ID corresponding to the first row on the particular page and the determined Item ID corresponding to the first row on a next page after the particular page. Another query 248 may be stored in memory 240 that may retrieve a requested page of data using the determined Item ID corresponding to the first row on the requested page and the determined Item ID corresponding to the last row on the requested page. Either or both of the above-described query 248 also may be received from an alternative source (e.g., network, cloud, user input, or the like). Thus, utilizing the page index table, only the number of rows corresponding to the size of the page may need to be examined or processed to retrieve a page of data.

Figure 3:
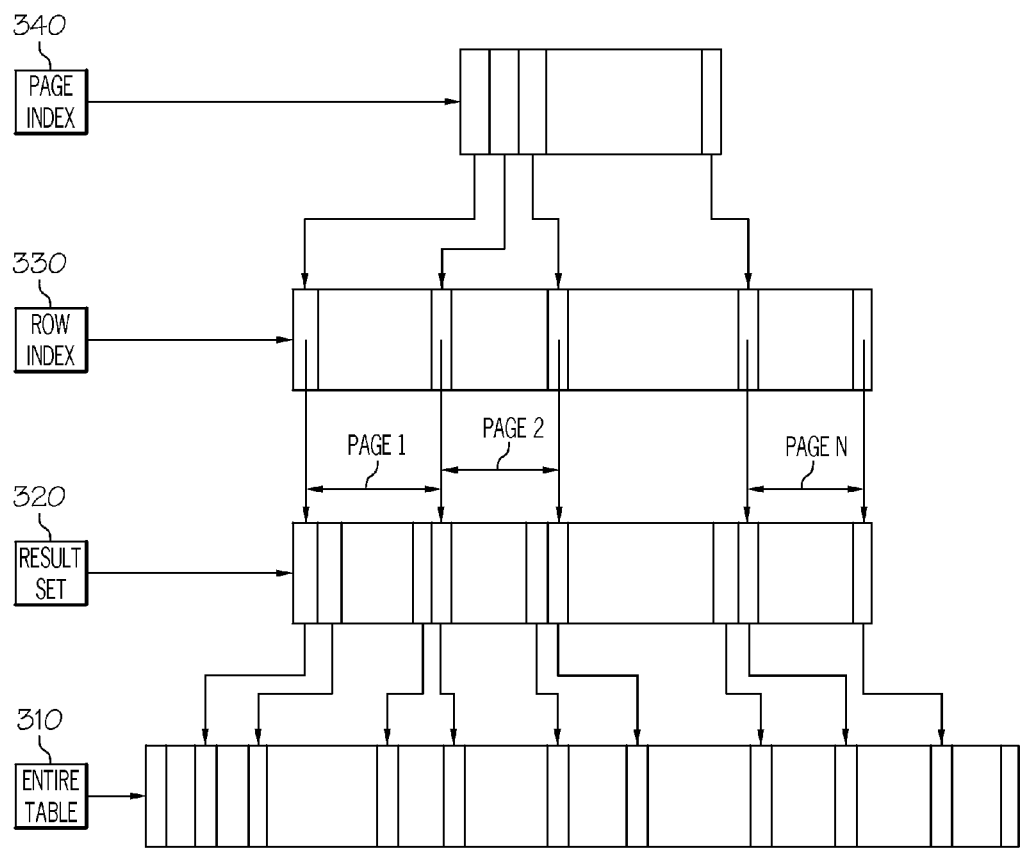
FIG. 3 illustrates a sample diagram depicting tables, according to an embodiment.

Referring to FIG. 3, the bottom portion of the diagram represents an entire table 310, which may contain, for example, up to and exceeding millions of rows. Each rectangular portion within the larger rectangle of the bottom portion may represent a row in entire table 310. From entire table 310, a result set 320 may be selected using a SELECT statement. The SELECT statement may also include JOIN statements to join with other tables. Further, the SELECT statement may include a WHERE clause to limit the kinds of rows that are returned. The arrows between the rows in result set 320 and the rows in entire table 310 indicate an example of rows that may be selected from entire table 310 to form result set 320.

Row index 330 may represents an index table that may be generated which maps the rows in result set 320 to an integer. Row index 330 may have two columns: an Index ID column and an Item ID column. The Index ID may be a sequentially assigned integer or natural number for each row. The Item ID may be a unique identifier for each row. Row index 330 may have the same number of rows as result set 320.

Page index 340 may represent the page index table that is generated from row index table 330 by selecting rows in which the Index ID may be one plus pagesize multiples. For example, with a pagesize of 5000, the values for Index ID may be 1, 5001, 10001, 15001, etc. The dashed, horizontal arrows may represent the span of rows that may comprise a page (i.e., Page 1, Page 2, . . . Page n) of a particular pagesize. Thus, page index 340 may be used to retrieve a particular page of data with a query for the particular page, such that only the number of rows corresponding to the size of the page may need to be examined or processed to retrieve a page of data.

Figure 4:
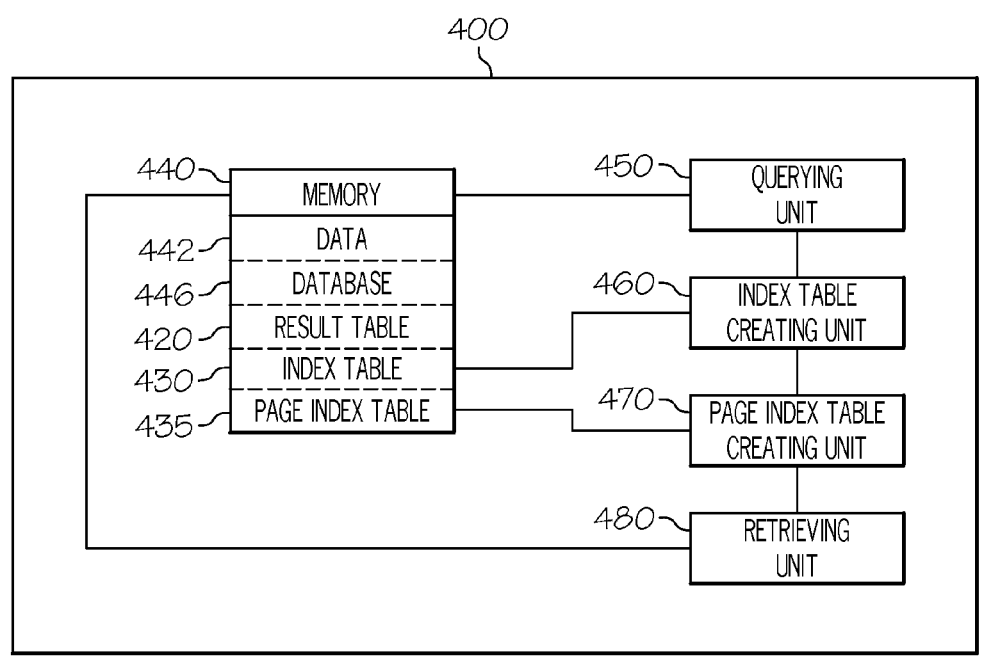
FIG. 4 illustrates a diagram depicting a system, according to an embodiment.

Referring to FIG. 4, a system 400 is depicted, according to an embodiment of the disclosure. System 400 may comprise a querying unit 450 configured to query a table of data to determine an item identifier for each item in the table.

Memory 440 may comprise data 442, a database 446, result table 420, index table 430, and page index table 435. Data 442 may correspond to any data that serves as input to or output from any unit or program in system 400. Database 446 may be any suitable database, whether currently known or developed in the future. Result table 420 may be generated or retrieved based on a query, from querying unit 450, of a database, table, set of data, or the like.

An index table creating unit 460 may be configured to generate an index table 430, which may be stored in memory 440. Index table 430 may comprise an Index ID column of sequential integers or natural numbers, and a corresponding Item ID column including the determined Item ID for each item in the table.

A page index table creating unit 470 may be configured to generate a page index table 435, which may be stored in memory 440. Page index table 435 may comprise the Item ID that corresponds to a first Index ID in the index table, and each Item ID that corresponds to one plus a pagesize multiple of the Index ID in the index table, such that the Item ID corresponding to a first row on each page is determined. For example, if pagesize is 3000, the page index table may include the determined Item ID that corresponds to Index ID of 1, 3001, 6001, 9001, etc. Page index table creating unit 470 may be configured to generate page index table 435 that further comprises each Item ID that corresponds to the pagesize multiple of the Index ID, such that the Item ID corresponding to a last row on each page is determined (e.g., if pagesize is 3000, page index table 435 may include the determined Item ID that corresponds to Index ID of 3000, 6000, 9000, etc.).

System 400 may also include a retrieving unit 480 configured to retrieve a desired page of data using the determined Item ID corresponding to the first row on the desired page and the determined Item ID corresponding to the first row on a next page after the desired page. Retrieving unit 480 may be configured to retrieve a requested page of data using the determined Item ID corresponding to the first item on the requested page and the determined Item ID corresponding to the last item on the requested page. Accordingly, utilizing the page index table 435, only the number of rows corresponding to the size of the page may need to be examined or processed to retrieve a particular page of data.

The present disclosure may allow for only a pagesize number of rows to be examined or processed for each page that is requested. According to embodiments of the disclosure, a page of data may be retrieved in the manner described above without requiring the logic be built into the database engine. Further, each page of data may not need to be retrieved in order. Rather, the retrieved page may skip, for example, from page 2 to page 17, without needing to visit the intermediate pages.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
    querying a table of data to determine a item identifier for each item in the table, respectively;
    storing in a memory an index table comprising: an index identifier column comprising sequential integers, and an item identifier column comprising the determined item identifier for each item in the table;
    storing in the memory a page index table comprising: the item identifier that corresponds to a first index identifier in the index table, and each item identifier that corresponds to one plus a pagesize multiple of the index identifier in the index table; and
    determining the item identifier corresponding to a first item on each page, respectively, based on the page index table.

2. The method of claim 1, further comprising: retrieving a desired page of data using the determined item identifier corresponding to the first item on the desired page and the determined item identifier corresponding to the first item on a next page after the desired page.

3. The method of claim 1, wherein the page index table further comprises each item identifier that corresponds to the pagesize multiple of the index identifier, such that the item identifier corresponding to a last item on each page is determined.

4. The method of claim 3, further comprising: retrieving a requested page of data using the determined item identifier corresponding to the first item on the requested page and the determined item identifier corresponding to the last item on the requested page.

5. An apparatus, comprising:
    a processor;
    a memory coupled to the processor containing a database;
    a query stored in the memory configured to retrieve an item identifier for each item in a result table selected from the database:
    an index table creator configured to generate an index table comprising: an index identifier column comprising sequential integers, and a corresponding item identifier cot comprising the retrieved item identifier for each item in the result table; and
    a page index table creator configured to generate a page index table comprising: the item identifier that corresponds to a first index identifier in the index table, and each item identifier that corresponds to one plus a pagesize multiple of the index identifier in the index table, wherein the item identifier corresponding to a first item on each page, respectively, is determined based on the page index table.

6. The apparatus of claim 5, further comprising: a query stored in the memory that retrieves a desired page of data using the determined item identifier corresponding to the first item on the desired page and the determined item identifier corresponding to the first item on a next page after the desired page.

7. The apparatus of claim 5, wherein the page index table creator is configured to generate the page index table that further comprises each item identifier that corresponds to the pagesize multiple of the index identifier, such that the item identifier corresponding to a last item on each page is determined.

8. The apparatus of claim 7, further comprising: a query stored in the memory that retrieves a requested page of data using the determined item identifier corresponding to the first item on the requested page and the determined item identifier corresponding to the last item on the requested page.

9. A computer program product comprising:
    a computer readable storage medium having computer readable program code embodied therewith, the computer readable program code comprising:
    computer readable program code configured to query a table of data to determine an item identifier for each item in the table;
    computer readable program code configured to generate an index table comprising: an index identifier column comprising sequential integers, and a corresponding item identifier column comprising the determined item identifier for each item in the table;

computer readable program code configured to generate a page index table comprising: the item identifier that corresponds to a first index identifier in the index table, and each item identifier that corresponds to one plus a pagesize multiple of the index identifier in the index table; and computer readable program code configured to determine the item identifier corresponding to a first item on each page, respectively, based on the page index table.

10. The computer program product of claim 9, further comprising: computer readable program code configured to retrieve a desired page of data using the determined item identifier corresponding to the first item on the desired page and the determined item identifier corresponding to the first item on a next page after the desired page.

11. The computer program product of claim 9, wherein the page index table further comprises each item identifier that corresponds to the pagesize multiple of the index identifier, such that the item identifier corresponding to a last item on each page is determined.

12. The computer program product of claim 11, further comprising: computer readable program code configured to retrieve a requested page of data using the determined item identifier corresponding to the first item on the requested page and the determined item identifier corresponding to the last item on the requested page.

13. A system, comprising:

a querying unit configured to query a table of data to determine an item identifier for each item in the table;

an index table creating unit configured to generate an index table comprising: an index identifier column comprising sequential integers, and a corresponding item identifier column comprising the determined item identifier for each item in the table;

a page index table creating unit configured to generate a page index table comprising: the item identifier that corresponds to a first index identifier in the index table, and each item identifier that corresponds to one plus a pagesize multiple of the index identifier in the index table, wherein the respective item identifier corresponding to a first item on each page, respectively, is determined based on the page index table; and a memory configured to store the table of data, the index table, and the page index table.

14. The system of claim 13, further comprising: a retrieving unit configured to retrieve a desired page of data using the determined item identifier corresponding to the first item on the desired page and the determined item identifier corresponding to the first item on a next page after the desired page.

15. The system of claim 13, wherein the page index table creating unit is configured to generate the page index table that further comprises each item identifier that corresponds to the pagesize multiple of the index identifier, such that the identifier corresponding to a last item on each page is determined.

16. The system of claim 15, further comprising: a retrieving unit configured to retrieve a requested page of data using the determined item identifier corresponding to the first item on the requested page and the determined item identifier corresponding to the last item on the requested page.

* * * * *